(12) United States Patent
Dubiel et al.

(10) Patent No.: US 10,472,139 B2
(45) Date of Patent: Nov. 12, 2019

(54) DOSING CAP AND SYSTEM AND METHOD OF USING SAME

(71) Applicant: Chapin Manufacturing, Inc., Batavia, NY (US)

(72) Inventors: David Dubiel, N. Chili, NY (US); Jim Fontaine, Batavia, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 174 days.

(21) Appl. No.: 15/672,904

(22) Filed: Aug. 9, 2017

(65) Prior Publication Data
US 2019/0047754 A1  Feb. 14, 2019

(51) Int. Cl.
| | | |
|---|---|---|
| B65D 47/12 | (2006.01) | |
| G01F 11/28 | (2006.01) | |
| G01F 11/00 | (2006.01) | |
| B65D 41/26 | (2006.01) | |
| B65D 47/24 | (2006.01) | |
| B65D 1/32 | (2006.01) | |

(52) U.S. Cl.
CPC ......... B65D 47/122 (2013.01); B65D 41/265 (2013.01); B65D 47/241 (2013.01); G01F 11/006 (2013.01); G01F 11/286 (2013.01); G01F 11/288 (2013.01); B65D 1/32 (2013.01)

(58) Field of Classification Search
CPC .. B65D 47/122; B65D 47/265; B65D 47/241; B65D 1/32; G01F 11/286; G01F 11/38; G01F 11/36; G01F 11/32; G01F 11/30; G01F 11/288; G01F 11/006; B67D 7/0288; B67D 7/0294

USPC ..................................................... 137/627.5
See application file for complete search history.

(56) References Cited

U.S. PATENT DOCUMENTS

| | | | | |
|---|---|---|---|---|
| 2,248,958 A | * | 7/1941 | Christensen | G01F 11/263 222/442 |
| 2,659,518 A | * | 11/1953 | Donnelly | G01F 11/32 222/449 |
| 3,141,579 A | * | 7/1964 | Medlock | A47G 19/32 222/207 |
| 3,212,539 A | * | 10/1965 | Felix | G01F 11/32 141/360 |

(Continued)

FOREIGN PATENT DOCUMENTS

EP    1870008    12/2007

*Primary Examiner* — Craig J Price
*Assistant Examiner* — Andrew J Rost
(74) *Attorney, Agent, or Firm* — Woods Oviatt Gilman LLP; Katherine H. McGuire, Esq.

(57) ABSTRACT

A dosing cap for dispensing a measured dose of material includes a housing, a sealing member and a biasing member. The housing has an inlet end residing within a container and receives the material. An outlet end dispenses the material. A dosage region is interposed between the inlet end and outlet end. The sealing member is received within the housing. The sealing member includes a first seal proximate the inlet end to selectively open or close the inlet end and a second seal proximate the outlet end to selectively open or close the outlet end. When the biasing member is unbiased, the inlet end is open, the outlet orifice is closed and the dosage region is charged with material. When the biasing member is compressed, the sealing member is biased so that the inlet end is closed and the outlet orifice is open whereby the material is dispensed.

12 Claims, 10 Drawing Sheets

(56) References Cited

U.S. PATENT DOCUMENTS

| | | | |
|---|---|---|---|
| 3,658,216 A * | 4/1972 | Schwartzman | G01F 11/32 |
| | | | 222/453 |
| 3,666,150 A * | 5/1972 | Liljeholm | G01F 11/34 |
| | | | 222/453 |
| 5,186,367 A * | 2/1993 | Hickerson | G01F 11/025 |
| | | | 222/207 |
| 5,915,427 A * | 6/1999 | Grabenkort | A61M 16/183 |
| | | | 141/18 |
| 6,155,459 A | 12/2000 | Bunschoten et al. | |
| 6,364,170 B1 | 4/2002 | Anderson et al. | |
| 6,675,845 B2 | 1/2004 | Volpenheim et al. | |
| 6,796,343 B2 | 9/2004 | Kelsey et al. | |
| 7,032,788 B2 | 4/2006 | Moreau et al. | |
| 7,497,359 B2 | 3/2009 | Bergin et al. | |
| 7,661,604 B1 | 2/2010 | MacLean-Blevins | |
| 8,783,518 B2 | 7/2014 | Cabiri et al. | |
| 9,523,596 B2 | 12/2016 | Skillin et al. | |
| 9,574,921 B2 | 2/2017 | Nielsen | |
| 2007/0295753 A1 | 12/2007 | Vangeel et al. | |
| 2010/0108721 A1 | 5/2010 | Andermatt | |
| 2010/0163578 A1 | 7/2010 | Mueller et al. | |
| 2016/0244222 A1 | 8/2016 | Sterling et al. | |

\* cited by examiner

DOSING CAP AND SYSTEM AND METHOD OF USING SAME

FIELD OF THE INVENTION

The present invention generally relates to a dosing cap, and more particularly to a container mounted dosing cap configured to dispense a measured dose of material from a source container, and still more particularly to a spring loaded dosage cap selectively biased from a resting fill position to an active dispensing position wherein the measured dose is dispensed from the dosing cap to a receiving vessel.

BACKGROUND OF THE INVENTION

One type of liquid dosing system uses a pump to draw liquid from a source container, followed by actuation of a valve or stopcock to dispense the drawn liquid. Another type of dosing system requires users to invert/revert the source container back-and-forth or squeeze the container to direct fluid to a reservoir before eventual dispensing of the directed fluid. In either system, precision of the dispensed volume may be limited. Also, using such systems may be time intensive and may subject users to unwanted exposure to potentially harmful material that is being transferred.

Further systems may use the principle of gravity-fed dispensing wherein the container with the material to be transferred is placed above the receiving vessel. A dispensing system having a series of valves and chambers then meters out a specific dosage. In such systems, a metering valve is open while a dispensing valve is closed so as to charge the measured dose. The metering valve is then closed and the dispensing valve is opened to thereby dispense the measured dose within the receiving vessel. The dispensing valve is then again closed before reopening the metering valve to recharge the dosage chamber with the next measured dose. While these systems may be more precise and have reduced chances of incidental contact by the user, such systems use complicated arrangements that may become damaged/leak or may frustrate users when trying to perform operations in the correct order for proper dispensing.

Thus, there remains a need for a dosing cap that repeatedly delivers a measured dose without requiring a user to return the container to its upright position between dosages and minimizes or eliminates the possibility of user contact with the dispensed material. The present invention satisfies these, as well as other, needs.

SUMMARY OF THE INVENTION

In view of the above and in accordance with an aspect of the present invention, the present invention is generally directed to a dosing cap for dispensing a measured dose from a source container to a receiving vessel. The dosing cap includes a housing, a sealing member and a biasing member. The housing may have an inlet end having an inlet aperture configured to reside within a container opening formed on the source container and receive the measured dose from the source container and an outlet end having an outlet orifice configured to couple with the receiving vessel. The housing may further define a dosage region interposed between the inlet end and outlet end where the dosage region defines the measured dose. The sealing member may include a shaft slidingly received within the housing and extending from the inlet end to the outlet end of the housing. The sealing member may include a first seal proximate the inlet end wherein the first seal is reciprocally coupled with and decoupled from the inlet aperture to selectively open or close the inlet aperture and a second seal proximate the outlet end wherein the second seal is reciprocally coupled with and decoupled from the outlet orifice to selectively open or close the outlet orifice. The biasing member may selectively bias the sealing member from a biased compressed condition to an unbiased resting condition. Thus, when the biasing member is in the unbiased resting condition, the inlet aperture is open, the outlet orifice is closed and the dosage region is configured to be charged with the measured dose. When the biasing member is biased to the compressed condition, the inlet aperture is closed and the outlet orifice is open whereby the measured dose is dispensed from the dosage region.

In a further aspect of the present invention, the housing further includes a weep hole located an intermediate distance between the inlet aperture and the outlet orifice. The sealing member may further include a third seal that is a longitudinally spaced distance from the weep hole when the biasing member is in the unbiased resting condition wherein the third seal overlaps and seals the weep hole when the biasing member is in the compressed condition.

In accordance with another aspect of the present invention, the present invention may be directed to a dosing apparatus configured to dispense a measured dose of a source material from a source container to a receiving vessel. The source container may include a sidewall to define a cavity configured to hold the source material wherein the sidewall includes an opening to permit material transfer therethrough. The apparatus may include a dosing cap and a receiving fitment. The dosing cap may include a housing, a sealing member and a biasing member. The housing may have an inlet end having an inlet aperture configured to reside within the source container opening and receive the measured dose from the source container and an outlet end having an outlet orifice configured to couple with the receiving vessel. The housing may further define a dosage region interposed between the inlet end and outlet end where the dosage region defines the measured dose. The sealing member may include a shaft slidingly received within the housing and extending from the inlet end to the outlet end of the housing. The sealing member may include a first seal proximate the inlet end that is reciprocally coupled with and decoupled from the inlet aperture to selectively open or close the inlet aperture and a second seal proximate the outlet end that is reciprocally coupled with and decoupled from the outlet orifice to selectively open or close the outlet orifice. The biasing member may selectively bias the sealing member from a biased compressed condition to an unbiased resting condition. Thus, when the biasing member is in the unbiased resting condition, the inlet aperture is open, the outlet orifice is closed and the dosage region is configured to be charged with the measured dose. When the biasing member is biased to the compressed condition, the inlet aperture is closed and the outlet orifice is open whereby the measured dose is dispensed from the dosage region. The receiving fitment may be configured to be mounted in communication with a fitment aperture defined within the receiving vessel. The receiving fitment may include a fitment housing having an actuator post configured to engage the sealing member of the dosing cap to actuate the biasing member to the compressed condition upon application of an actuation force to the dosing cap whereby the measured dose is dispensed from the dosage region into the receiving vessel.

In accordance with a further aspect of the present invention, the opening may be defined by a neck portion of the source container and the dosing cap housing may further include an external annular ring configured to engage the neck portion whereby the inlet end resides within the cavity and the outlet end resides outside of the cavity. The external surface of the neck portion may also include male threading. The dosing apparatus may then further include a retaining cap including a sidewall and top panel. The top panel of the retaining cap includes a cap aperture proportioned to permit passage of the outlet end of the dosing cap therethrough while the external annular ring engages the top panel whereby at least a portion of the inlet end is received within the retaining cap sidewall. The internal surface of the sidewall includes female threads configured to threadably engage with the male threading of the neck portion so as to releasably secure the dosing cap to the container.

In still another aspect of the present invention, the fitment housing may include a tubular sidewall having an open top edge, open bottom edge and an annular collar located on an external surface of the tubular sidewall an intermediate distance between the top end and bottom edge thereby dividing the fitment housing into an upper portion and a lower portion. The receiving fitment may be mounted within the fitment aperture until the annular collar engages the receiving vessel whereby the lower portion resides within the receiving vessel and the upper portion extends outwardly from the receiving vessel. The receiving fitment may further include a locking nut having first threading configured to engage corresponding second threading defined on the lower portion of the tubular sidewall whereby the locking nut releasably secures the receiving housing to the receiving vessel. The receiving fitment may also include a gasket positioned between the locking nut and the receiving vessel. A fitment cap may have cap threading configured to engage corresponding upper sidewall threading defined on the upper portion of the tubular sidewall such that the fitment cap is releasably mounted onto the tubular sidewall. The fitment cap may also include a pressure release valve in communication with fitment aperture whereby excess pressure within the receiving vessel is relieved by the pressure release valve.

In accordance with yet a further aspect of the present invention, the present invention may be directed to a dosing system configured to dispense a measured dose of a source material. The dosing system may comprise a source container, a dosing cap and a receiving vessel. The source container may have a sidewall defining a cavity configured to hold the source material. The sidewall may further define an opening to permit transfer of the source material therethrough. The dosing cap may be configured to mount to the source container and include a housing, a sealing member and a biasing member. The housing may have an inlet end having an inlet aperture configured to reside within a container opening formed on the source container and receive the measured dose from the source container and an outlet end having an outlet orifice configured to couple with the receiving vessel. The housing may further define a dosage region interposed between the inlet end and outlet end where the dosage region defines the measured dose. The sealing member may include a shaft slidingly received within the housing and extending from the inlet end to the outlet end of the housing. The sealing member may include a first seal proximate the inlet end wherein the first seal is reciprocally coupled with and decoupled from the inlet aperture to selectively open or close the inlet aperture and a second seal proximate the outlet end wherein the second seal is reciprocally coupled with and decoupled from the outlet orifice to selectively open or close the outlet orifice. The biasing member may selectively bias the sealing member from a biased compressed condition to an unbiased resting condition. Thus, when the biasing member is in the unbiased resting condition, the inlet aperture is open, the outlet orifice is closed and the dosage region is configured to be charged with the measured dose. When the biasing member is biased to the compressed condition, the inlet aperture is closed and the outlet orifice is open whereby the measured dose is dispensed from the dosage region. The receiving vessel may have a receiving fitment configured to be mounted in communication with a fitment aperture defined within the receiving vessel. The receiving fitment may include a fitment housing having an actuator post configured to engage the sealing member of the dosing cap to actuate the biasing member to the compressed condition upon application of an actuation force to the dosing cap whereby the measured dose is dispensed from the dosage region into the receiving vessel.

In another aspect of the present invention, the receiving vessel may further include a discharge port a spaced distance from the fitment aperture. The discharge port is configured to receive a fluid delivery mechanism whereby a fluid within the receiving vessel is discharged through the fluid delivery mechanism. The receiving fitment may thus be selectively removed from the receiving vessel without requiring removal of the fluid delivery mechanism whereby the receiving vessel may be filled with a recharge fluid through the fitment aperture.

In accordance with a further aspect of the present invention, the present invention may be directed to a method of dosing a measured dose. The method may comprise providing a dosing apparatus including a source container and a dosing cap; providing a receiving vessel having a receiving fitment configured to be mounted in communication with a fitment aperture defined within the receiving vessel, the receiving fitment including an actuator post configured to engage a sealing member of the dosing cap; inverting the container to charge the dosing cap with the measured dose; mounting the source container onto the receiving fitment whereby the sealing member of the dosing cap is positioned to engage the actuator post on the receiving fitment; and applying an actuation force to the dosing cap thereby actuating the sealing member to bias a biasing member to the compressed condition to thereby dispense the measured dose from the source container into the receiving vessel.

In a further aspect of the present invention, the method may further include removing the actuation force from the dosing cap without reverting the source container; and applying a second actuation force to the dosing cap to thereby dispense a second measured dose into the receiving vessel.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
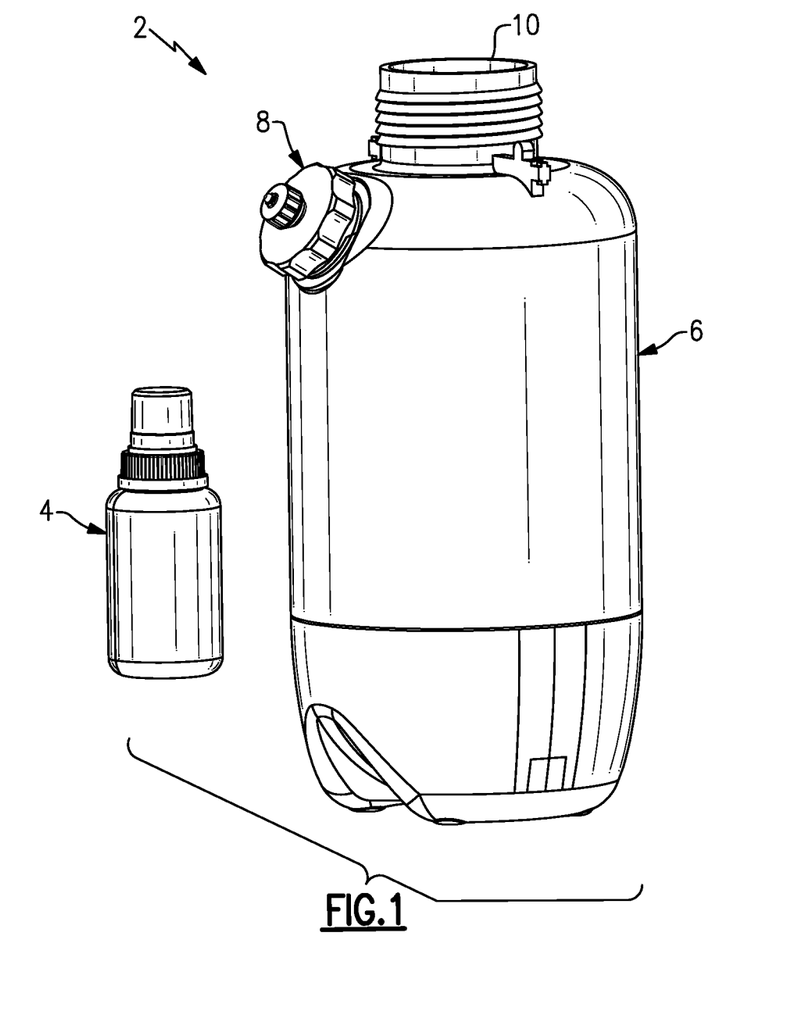
FIG. 1 is a perspective view of a dosing system in accordance with an aspect of the present invention.

Referring now to FIG. 1, there is shown a dosing system 2 generally comprising a dosing apparatus 4 configured to selectively dispense a measured dose of a source material into a receiving vessel 6. In one aspect of the present invention, the source material may be a fluid or solution. To that end, receiving vessel 6 may include a receiving fitment 8 adapted to mate with dosing apparatus 4 to thereby effectuate material transfer. As shown in FIG. 1 and as will be discussed in greater detail below, receiving fitment 8 may be mounted to receiving vessel 6 a spaced distance from discharge port 10. Discharge port 10 may be adapted to receive a fluid delivery mechanism (not shown), such as but not limited to a trigger sprayer, compression sprayer and the like.

Figure 2:
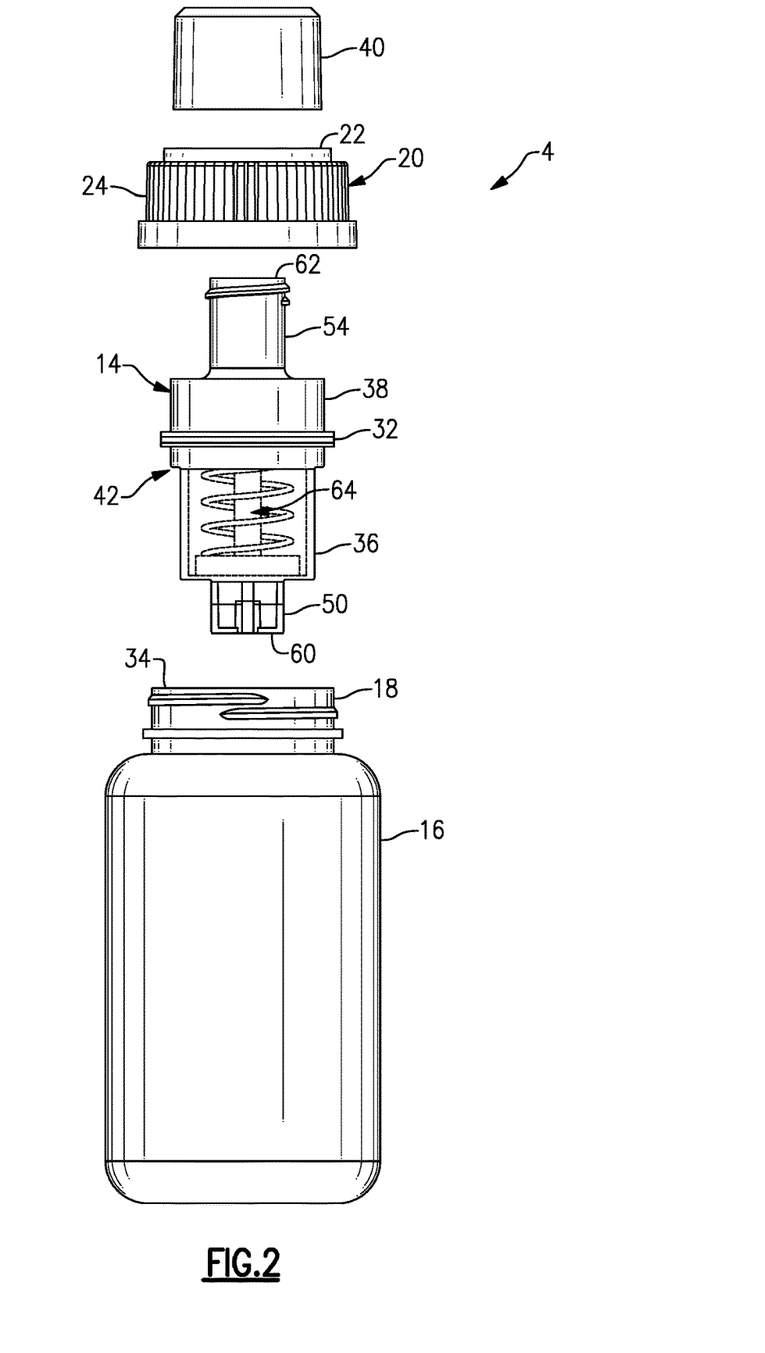
FIG. 2 is an exploded view of a dosing apparatus used within the dosing system shown in FIG. 1.
Figure 3:
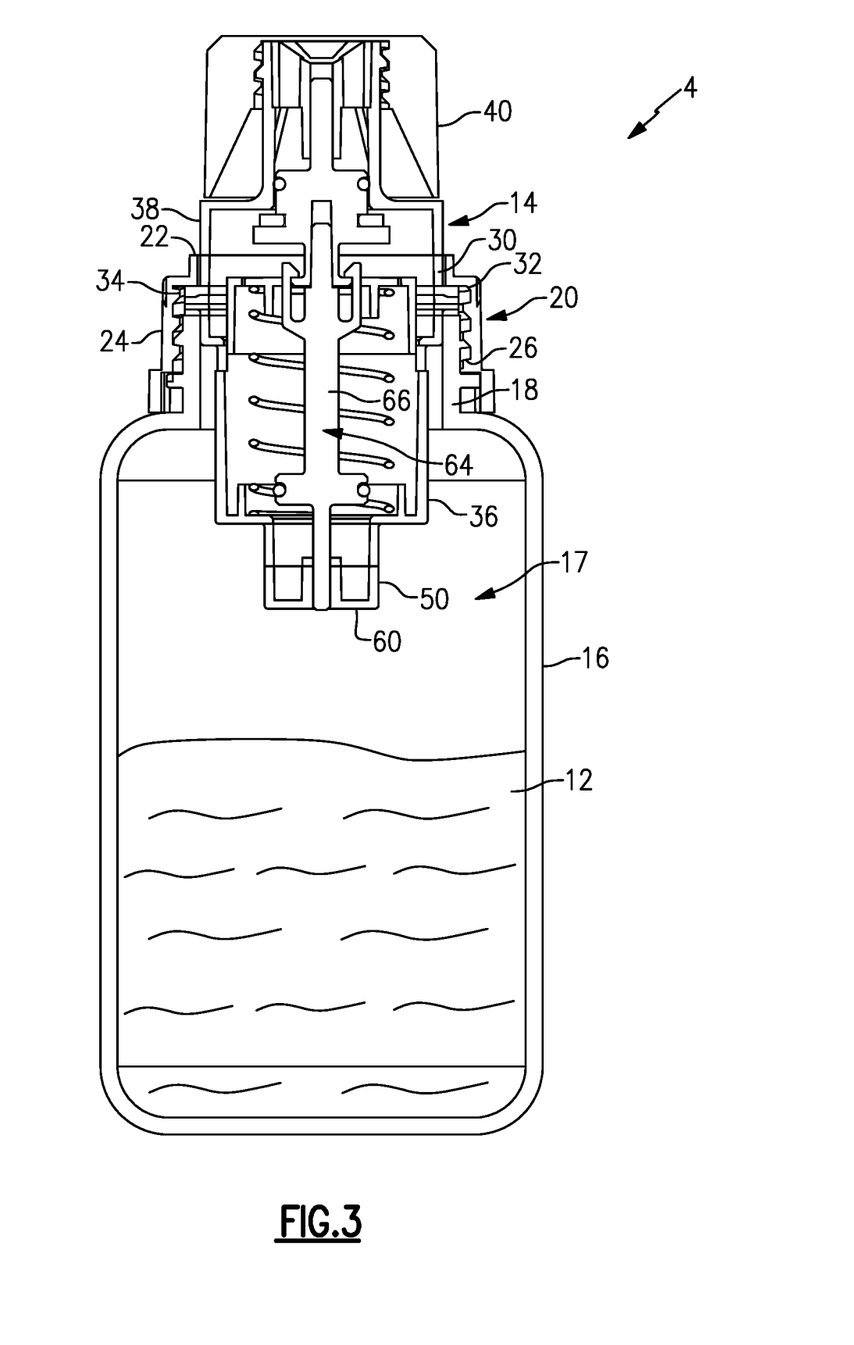
FIG. 3 is a cross section view of the dosing apparatus shown in FIG. 1, taken generally along line 3-3 in FIG. 1.
Figure 4:
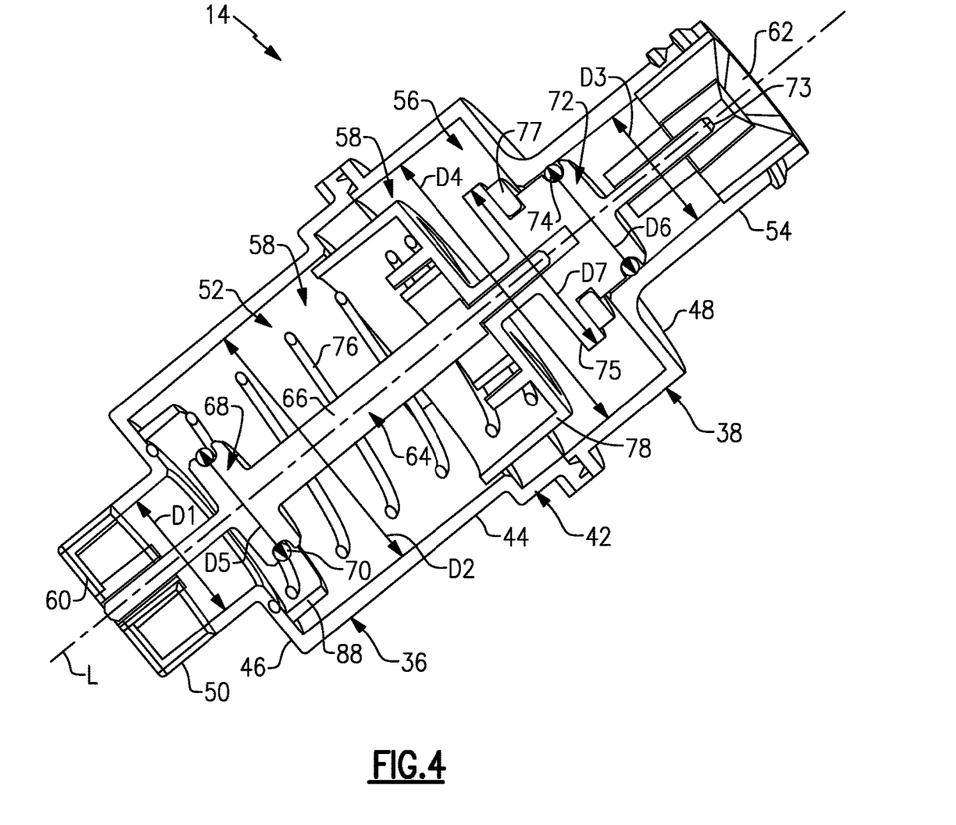
FIG. 4 is a cross section view of a dosing cap used within the dosing apparatus shown in FIGS. 2-3, taken generally along line 4-4 in FIG. 2.

With reference to FIGS. 2 and 3, dosing apparatus 4 is configured to dispense a measured dose of a source material 12 therefrom. Dosing apparatus 4 may generally comprise a dosing cap 14 mounted onto a source container 16. In one aspect of the present invention, dosing cap 14 may be directly threadably coupled to threaded neck portion 18 of source container 16. In a further aspect of the present invention, dosing apparatus 4 may additionally include a retaining cap 20 having a top panel 22 and sidewall 24 defining female threads 26 configured to threadably engage male threads 28 defined on neck portion 18. Top panel 22 of retaining cap 20 may define a cap aperture 30 configured to permit passage of dosing cap 14 therethrough. To that end, dosing cap 14 may include an external annular ring 32 proportioned to rest upon mouth opening 34 of neck portion 18 annular ring 32 may then be engaged by top panel 22 of retaining cap 20 to securely capture annular ring 32 between source container 16 and retaining cap 20. In this manner and as will be discussed in greater detail below, an inlet portion 36 of dosing cap 14 may then reside within cavity 17 defined by source container 16 while an outlet portion 38 may extend outwardly from neck portion 18. A dosing cap cover 40 may threadably mount to dosing cap 14 when dosing apparatus 4 is not in use.

Turning now to FIGS. 2-6, dosing cap 14 may include a housing 42 defined by a generally tubular sidewall 44. Inlet portion 36 defined by tubular sidewall 44 may include an inlet step 46 while outlet portion 38 may include an outlet step 48. In this manner, inlet portion 36 may define an inlet end 50 and a first dosage sub-region 52, wherein inlet end 50 has an internal diameter D1 which is smaller than internal diameter D2 of first dosage sub-region 52. Outlet portion 38 may similarly define an outlet end 54 and a second dosage sub-region 56, wherein outlet end 54 has an internal diameter D3 which is smaller than internal diameter D4 of second dosage sub-region 56. First and second dosage sub-regions may define dosage region 58 which is proportioned to define the measured dose that will be dispensed from dosing cap 14, as will be discussed in greater detail below. To that end, inlet end 50 may include an inlet aperture 60 configured to reside within source container 16 and communicate with cavity 17 when dosing cap 14 is mounted to source container 16 as described above. Source material 12 may selectively pass into dosage region 58 through inlet aperture 60. Outlet end 54 may include an outlet orifice 62 whereby the measured dose may be selectively passed from dosage region 58 through outlet orifice 62 during dispensing.

Received within housing 42 is sealing member 64. Sealing member 64 includes a shaft 66 extending from inlet end 50 to outlet end 54. Shaft 66 includes a first seal unit 68 proximate inlet end 50 and a second seal unit 72 proximate outlet end 54. As will be described in greater detail below, first seal unit 68 includes a first seal, such as O-ring 70 having an external diameter D5 which is substantially the same as diameter D1 of inlet end 50 so as to reciprocally couple with and decouple from inlet end 50 to selectively open or close inlet aperture 60. Similarly, second seal unit 72 includes a second seal, such as O-ring 74 having an external diameter D6 which is substantially the same as diameter D3 of outlet end 54 so as to reciprocally couple with and decouple from outlet end 54 to selectively open or close outlet orifice 62. To further prevent or minimize leakage of material from dosing cap 14, second seal unit 72 may further include a flange 75 having a diameter D7 which is greater than outlet end diameter D3 such that flange 75 abuts outlet step 48 when charging dosage region 58 with source material 12. An auxiliary seal, such as a gasket 77, may also be mounted onto second seal unit 72 whereby gasket 77 is interposed between flange 75 and outlet step 48.

Figure 7:
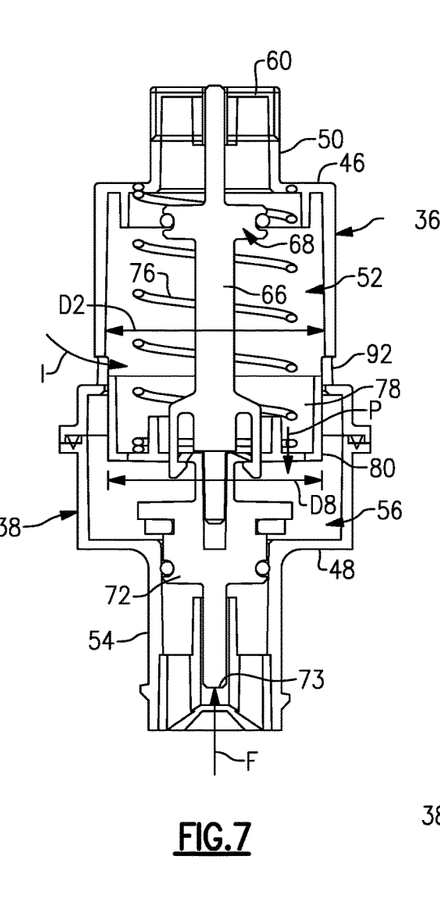
FIG. 7 is a cross section view a dosing cap showing the sealing member and biasing member in the unbiased resting condition.
Figure 8:
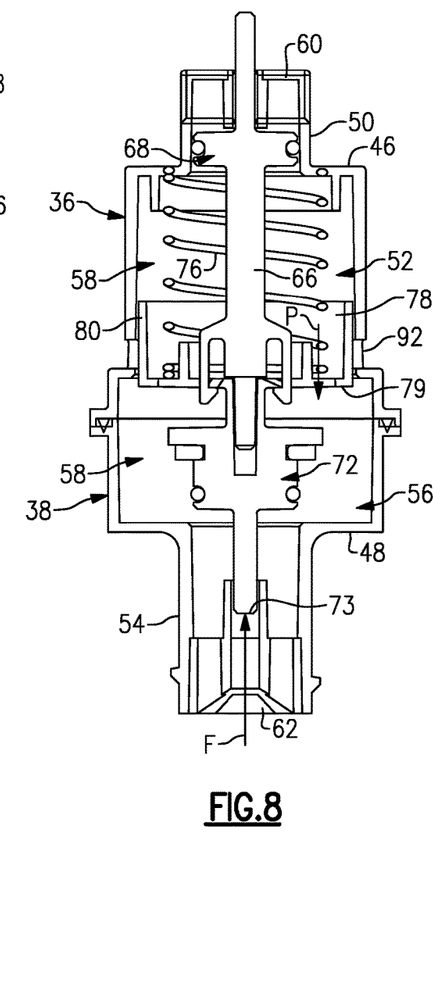
FIG. 8 is a cross section view a dosing cap showing the sealing member and biasing member in the biased compressed condition.

With additional reference to FIGS. 7 and 8, to effectuate reciprocal travel of first and second seal units 68, 70, housing 42 may include a biasing member, such as but not limited to coil spring 76. Thus, when coil spring 76 is in an unbiased resting condition (FIG. 7), inlet aperture 60 is open, outlet orifice 62 is closed and dosage region 58 is configured to be charged with the measured dose of source material 12. However, when coil spring 76 is biased to a compressed condition as shown in FIG. 8 (such as through application of an external actuation force upon shaft outlet terminus 73, generally indicated by arrow F in FIGS. 7 and 8), inlet aperture 60 is closed and outlet orifice 62 is open such that the measured dose may be dispensed from dosage region 58 through outlet orifice 62. To properly seat coil spring 76 within housing 42, shaft 66 may include a basket portion 78 having base wall 79 and an outer annular wall 80 and crenellated inner annular wall 82 perpendicularly extending therefrom to define a gap 84 therebetween. A first end 86 of coil spring 76 may then reside within gap 84 and against base wall 79. Inlet step 46 may include an inwardly extending annular inlet wall 88 between inlet end 50 and the portion of sidewall 44 defining first dosage sub-region 52. Second end 90 of coil spring 76 seats within annular inlet wall 88 so as to limit lateral movement of coil spring 76 (i.e., limit travel other than along longitudinal axis L of shaft 66).

In a further aspect of the present invention, housing 42 may define one or more weep holes 92 proximate annular ring 32 on inlet portion 36. Weep holes 92 may enable selective communication between cavity 17 and first dosage sub-region 52 when source container 16 is inverted and coil spring 76 is in its unbiased resting condition (see e.g., arrows I in FIG. 7). However, upon actuation of shaft 66 to bias coil spring to its compressed condition, outer annular wall 80 of basket portion 78 operates as a third seal within first dosage sub-region 52. That is, outer annular wall 80 has an external diameter D8 substantially the same as internal diameter D2 of first dosage sub-region 52. Thus, when coil spring 76 is in it compressed condition (FIG. 8), weep holes 92 are occluded by outer annular wall 80 such that material can no longer communicate between cavity 17 and first dosage sub-region 52. Base wall 79 of basket portion 78 may include one or more apertures 94 (FIG. 5) therein which provides a communication pathway between first dosage sub-region 52 and second dosage sub-region 56, generally indicated by arrow P in FIGS. 7 and 8. Thus, as shown in FIG. 8, with coil spring 76 in the compressed condition and weep holes 92 occluded by outer annular wall 80 and outlet orifice 62 open, the source material of the measured dose within the combined dosage region 58 may be dispensed through outlet orifice 62 while non-measured source material 12 within cavity 17 of source container 16 remains within source container 16. After the measured dose has been dispensed from dosing cap 14, the user may then remove the external actuation force F such that coil spring 76 returns to its unbiased resting position thereby once again opening inlet aperture 60, closing outlet orifice 62 and configuring dosage region 58 to be charged with the next successive measured dose of source material 12. Outer annular wall 80 of basket portion 78 is also displaced such that weep holes 92 are once again uncovered and open. Opening of weep holes 92 may also inhibit formation of a vacuum within dosing cap 14.

Figure 5:
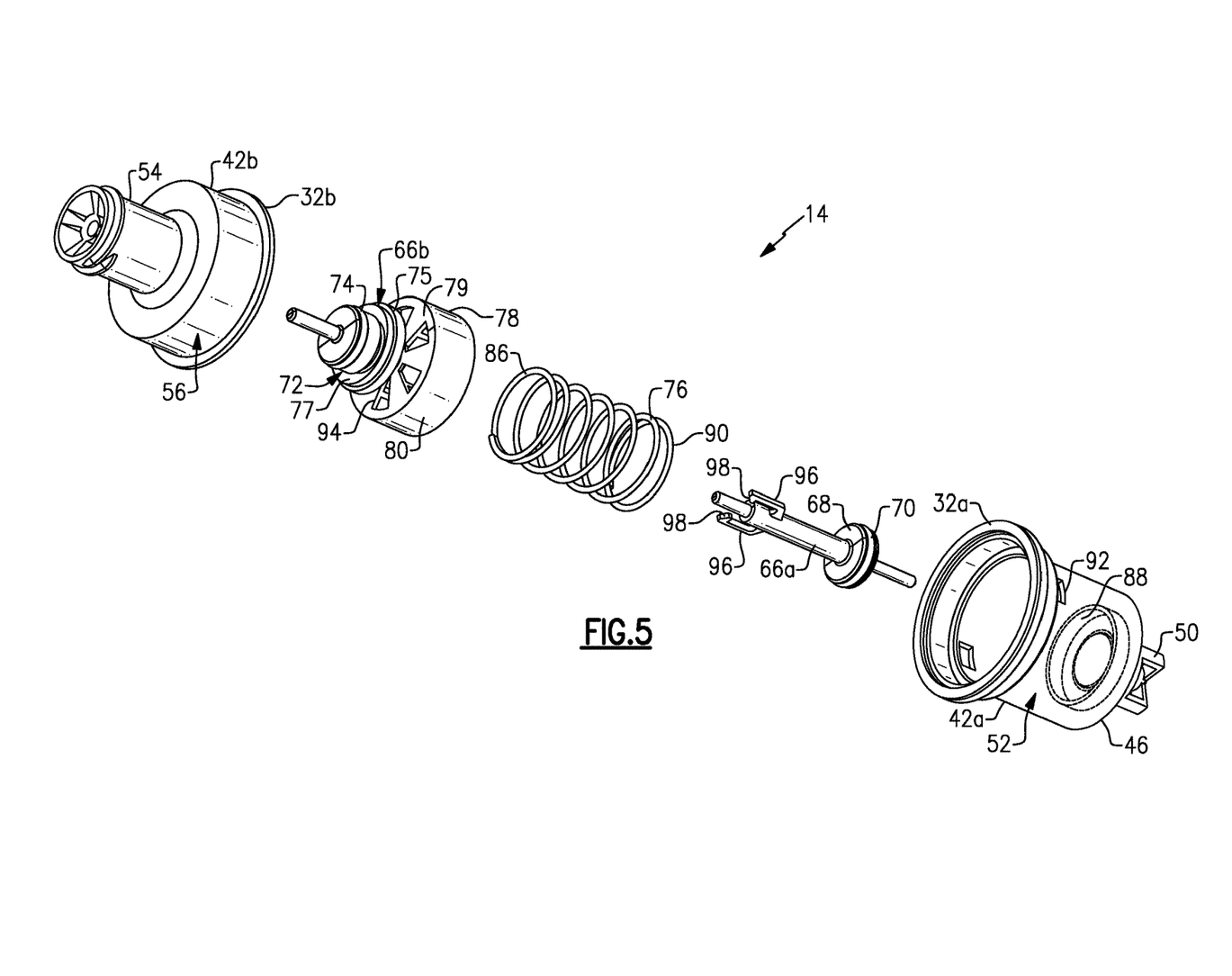
FIG. 5 is a top perspective view of an exploded dosing cap shown in FIG. 2.
Figure 6:
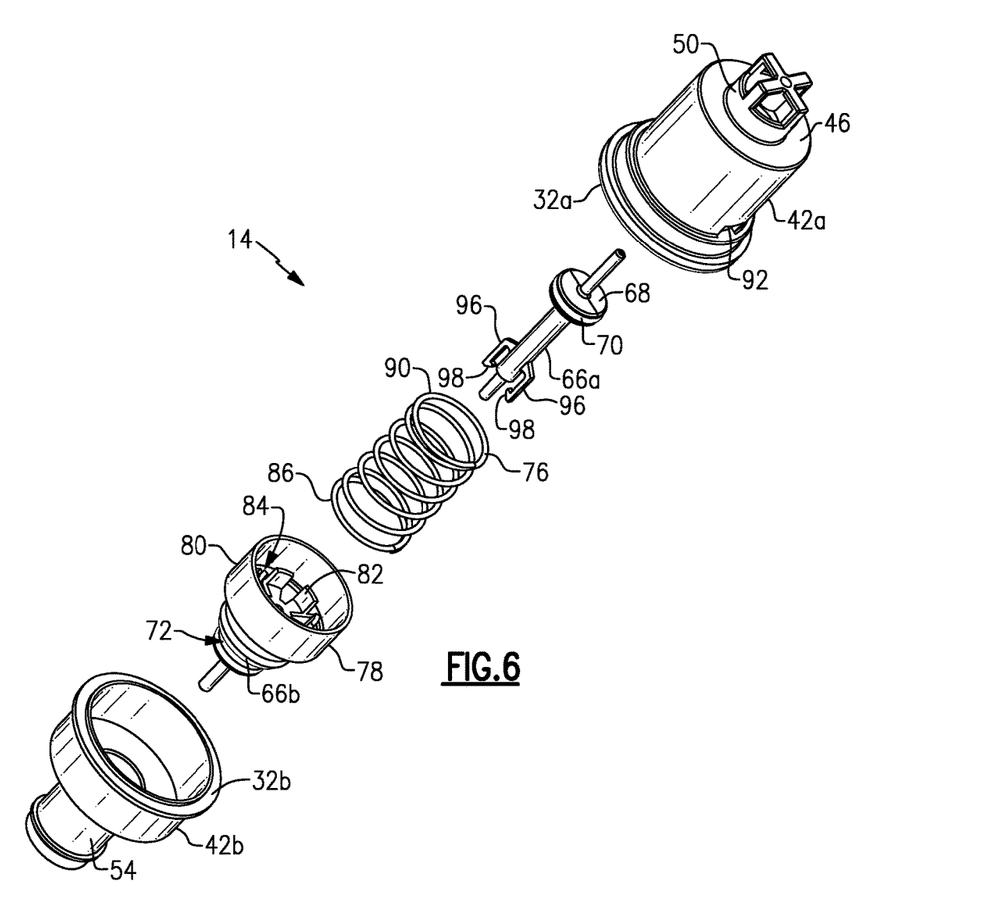
FIG. 6 is a bottom perspective view of an exploded dosing cap shown in FIG. 2.

With attention to FIGS. 5 and 6, dosing cap 14 may be fabricated as a number of constituent parts which are then subsequently consolidated into a single dosing cap 14 unit. To that end, shaft 66 may be fabricated as two shaft subunits 66a, 66b. Shaft subunit 66a may include first seal unit 68 while shaft subunit 66b comprises second seal unit 72 and basket portion 78. In one aspect of the present invention, shaft subunits 66a, 66b may be physically bonded or fused together to form a unitary shaft 66. In a further aspect of the present invention, and as shown in FIGS. 5 and 6, shaft subunit 66a may further carry a plurality of forks 96 having barbed ends 98 configured to pass through apertures 94 of base wall 79 of basket portion 78 wherein barbed ends 98 latch upon base wall 79 so as to securely coupled shaft subunit 66a to shaft subunit 66b (see FIGS. 7 and 8). Similarly, first dosage sub-region 52 may be defined by a first housing subunit 42a while second dosage sub-region 56 may be defined by a second housing subunit 42b which are formed as separate components that are subsequently secured together through a fluid-tight union, such as through a weld or use of a permanent adhesive, such as an epoxy. To that end, first housing subunit 42a may include an annular ring 32a while second housing subunit 42b may include a corresponding annular ring 32b such that, once secured together, annular rings 32a, 32b constitute annular ring 32 described above. It should be noted that shaft 66 (combined shaft subunits 66a, 66b) and coil spring 76 must be arranged within first housing subunit 42a and second housing subunit 42b prior to securing the housing subunits together.

In accordance with an aspect of the present invention, dosing cap 14 may be fabricated from any suitable material, such as but not limited to steel, aluminum or plastic. In one aspect of the invention, first housing subunit 42a and second housing subunit 42b comprise a clear plastic material, such as but not limited to an acrylic or polycarbonate based material. In this manner, filling and dispensing of dosage region 58 may be at least partially viewable by the user.

Figure 9:
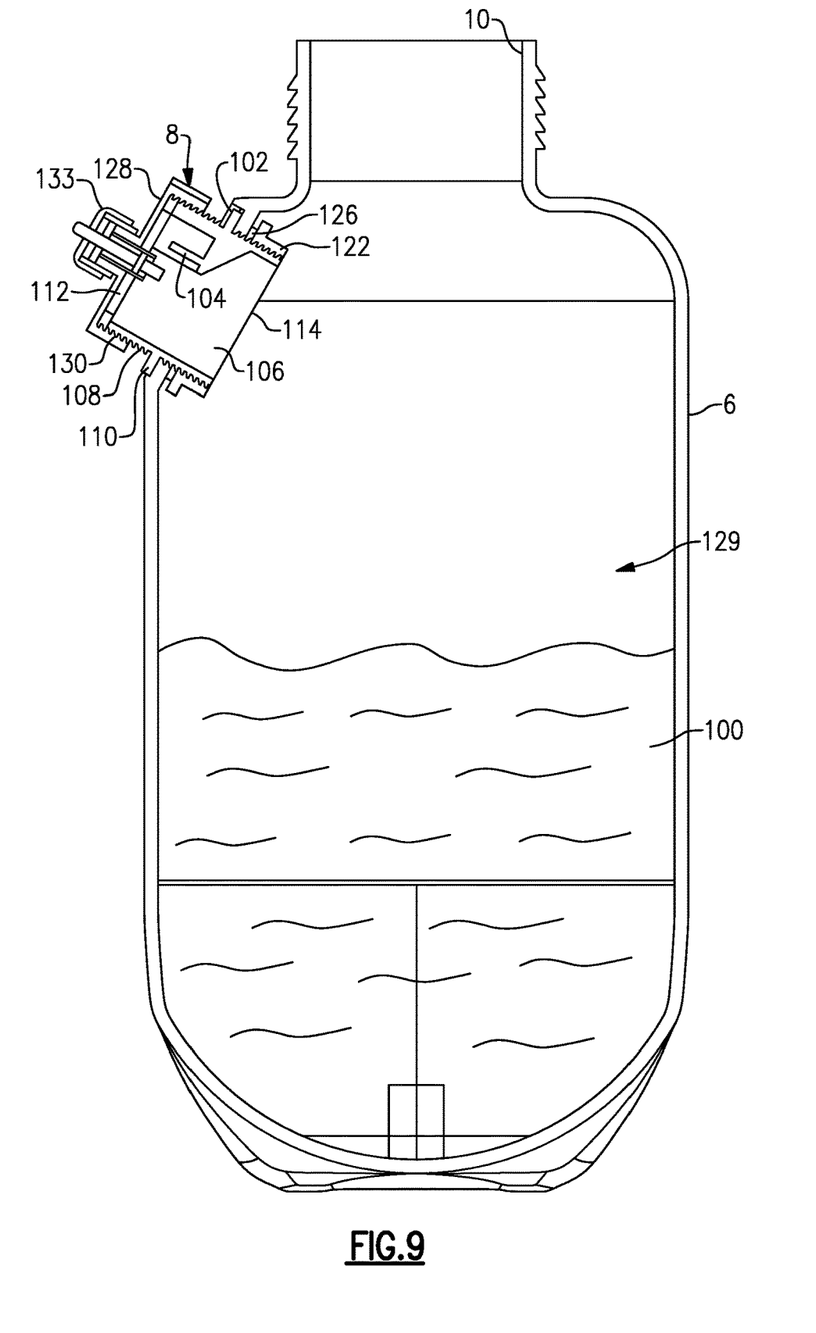
FIG. 9 is a cross section view of a receiving vessel with receiving fitment used within the dosing system shown in FIG. 1.

Turning now to FIG. 9 and with reference to FIG. 1, in accordance with an aspect of the present invention, dosing apparatus 4 may be configured to selectively dispense source material 12 into receiving vessel 6. Receiving vessel 6 may include a diluent, such as water 100 within which source material 12 may be diluted prior to use. To that end, receiving vessel 6 may include receiving fitment 8 configured to engage with dosing cap 14 of dosing apparatus 4 as will be discussed in greater detail below. Receiving vessel 6 may also include a discharge port 10 configured to receive a fluid delivery mechanism, such as a trigger sprayer, compression sprayer or the like.

Typically, fluid delivery mechanisms generally include tubing in communication with water 100 so as to draw water 100 (and added source material 12) from receiving vessel 6 to a spray nozzle or other delivery modality. As a result, additional water 100 (and source material 12) will be needed to recharge receiving vessel 6. Typically in the art, when refilling a receiving vessel, the fluid delivery mechanism is first removed such that refill water and source material may be added through the now open discharge port. However, such activities usually require a user to initially set the fluid delivery system down, such as on the ground or other dirty surface, thereby introducing dirt and debris into the receiving vessel upon remounting of the fluid delivery system. Additionally, the user may come into contact with the chemicals that are within the diluent and/or source material.

Thus, in accordance with an aspect of the present invention, receiving vessel 6 may further define a fitment aperture 102 a spaced distance from discharge port 10. Receiving fitment 8 may then be mounted to coincide with fitment aperture 102 whereby source material 12 and water 100 may be added to receiving vessel 6 without requiring removal of any fluid delivery mechanism mounted to discharge port 10. Receiving fitment 8 may include an actuator post 104 oriented substantially parallel to the longitudinal axis of receiving fitment 8 whereby actuator post 104 may selectively engage sealing member 64 of dosing cap 14 so as to actuate coil spring 76 to its compressed condition as described above. To that end, receiving fitment 8 may be permanently molded to receiving vessel 6. Alternatively, as shown in FIG. 9, receiving fitment 8 may be removably secured to receiving vessel 6.

Figure 10:
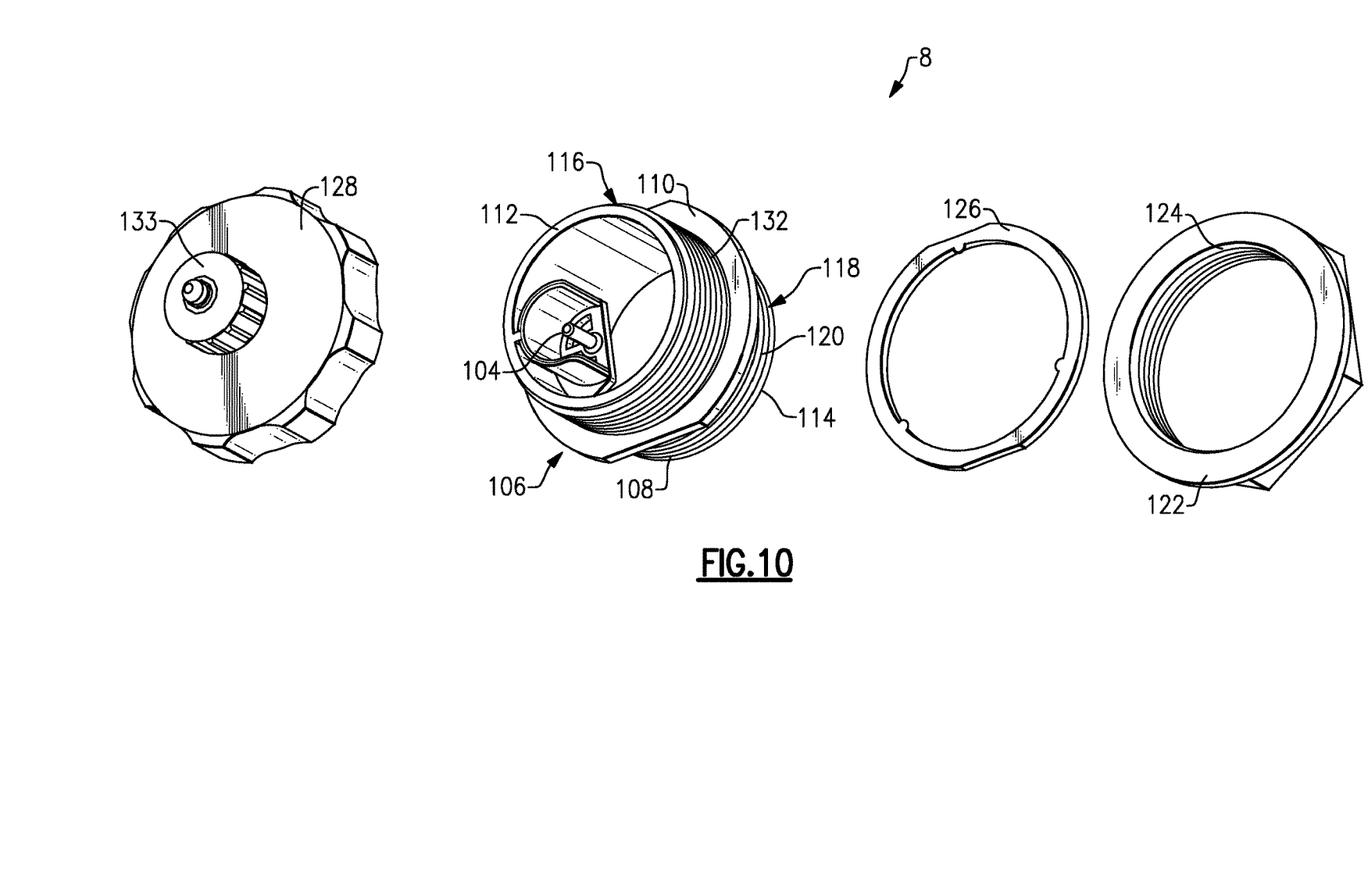
FIG. 10 is an exploded view of the receiving fitment shown in FIG. 1.

With additional reference to FIG. 10, receiving fitment 8 may include a fitment housing 106 having a tubular sidewall 108 proportioned to partially pass through fitment aperture 102. To properly position fitment housing 106 within fitment aperture 102, tubular sidewall 108 may include an external annular collar 110 located an intermediate distance between top end 112 and bottom end 114 of tubular sidewall 108. Annular collar 110 may then engage receiving vessel 6 once fitment housing 106 is positioned within fitment aperture 102. Annular collar 110 may also divide fitment housing 106 into an upper portion 116 and lower portion 118 wherein lower portion 118 resides within receiving vessel 6 and upper portion 116 extends outwardly from receiving vessel 6 when receiving fitment 8 is properly mounted.

To secure receiving fitment 8 within fitment aperture 102, lower portion 118 may include threading, such as male threading 120. A mating locking nut 122 may include corresponding threading, such as female threading 124 whereby locking nut 122 may be threadably mounted onto lower portion 118 thereby clamping receiving vessel 6 between locking nut 122 and annular collar 110. Receiving fitment 8 may further include a gasket 126 configured to be interposed between locking nut 122 and receiving vessel 6 so as to facilitate a fluid-tight seal between receiving fitment 8 and receiving vessel 6. Receiving fitment 8 may further include a fitment cap 128 wherein fitment cap 128 includes threading 130 configured to mate with corresponding threading 132 on upper portion 116 of fitment housing 106. Fitment cap 128 is normally threaded onto receiving fitment 8 to prevent entrance of any unwanted materials into chamber 129 of receiving vessel 6. When dispensing source material or refilling receiving vessel 6 with water 100, fitment cap 128 is removed from receiving fitment 8. Dosing apparatus 4 may then engage actuator post 104 to dispense source material 12 as described above and/or receive diluent/water 100, such as via a hose (not shown). Fitment cap 128 may further include a pressure release valve 133 in communication with chamber 129 whereby excess pressure within the receiving container is relieved through pressure release valve 133.

Figure 11:
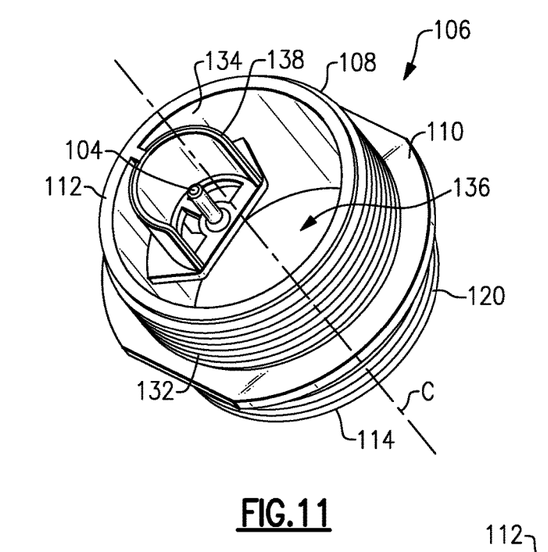
FIG. 11 is an isolated view of a fitment housing of the receiving fitment shown in FIG. 10.
Figure 12:
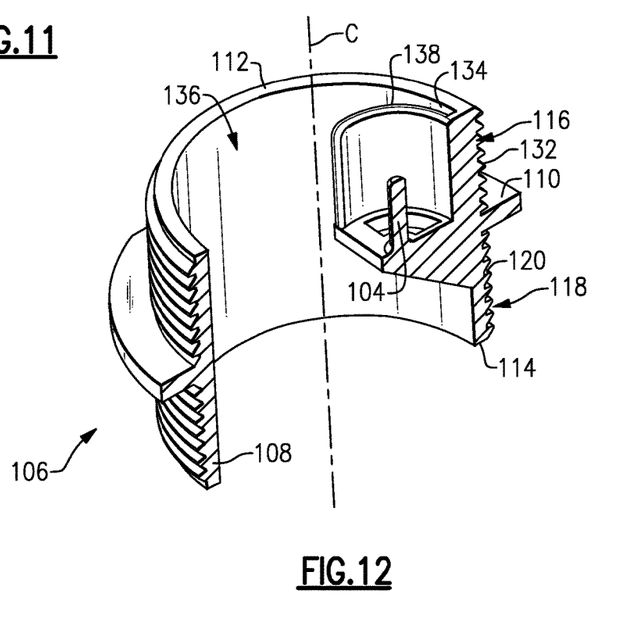
FIG. 12 is a cross section view of the fitment housing, taken generally along line 12-12 in FIG. 11.

As shown in FIGS. 11 and 12, actuator post 104 may be coupled to internal wall 134 of fitment housing 106 proximate tubular sidewall 108 and offset from the central axis C of fitment housing 106. In this manner, water 100 or other materials may be added to receiving vessel 6 through the unobstructed portion 136 of fitment housing 106. As further shown in FIGS. 11 and 12, actuator post 140 may be situated within an actuator sidewall 138. Actuator sidewall 138 may be proportioned to receive outlet end 54 of dosing cap 14 so as to aid alignment of sealing member 64 of dosing cap 14 with actuator post 104. Actuator sidewall 138 may also provide additional structural support for actuator post 104 so as to accommodate stresses imparted onto actuator post 104 and receiving fitment 8 through application of actuation force F as described above.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A method of dosing a measured dose of a source material, the method comprising:
    a) providing a dosing apparatus comprising:
        i) a source container having a sidewall defining a cavity configured to hold the source material, wherein the sidewall further defines an opening to permit transfer of the source material therethrough; and
        ii) a dosing cap configured to be mounted to the source container, the dosing cap comprising:
            a) a housing including an inlet end having an inlet aperture configured to reside within the source container opening and receive the measured dose from the source container, and an outlet end having an outlet orifice configured to couple with the receiving vessel, wherein the housing further defines a dosage region interposed between the inlet end and outlet end, the dosage region defining the measured dose;
            b) a sealing member including a shaft slidingly received within the housing and extending from the inlet end to the outlet end of the housing, wherein the sealing member includes a first seal proximate the inlet end that is reciprocally coupled with and decoupled from the inlet aperture to selectively open or close the inlet aperture, and a second seal proximate the outlet end that is reciprocally coupled with and decoupled from the outlet orifice to selectively open or close the outlet orifice; and
            c) a spring to selectively bias the sealing member from a biased compressed condition to an unbiased resting condition wherein, when the spring is in the unbiased resting condition, the inlet aperture is open, the outlet orifice is closed and the dosage region is configured to be charged with the measured dose, and wherein, when the spring is biased to the compressed condition, the inlet aperture is closed and the outlet orifice is open whereby the measured dose is dispensed from the dosage region;
    b) providing a receiving vessel having a receiving fitment configured to be mounted in communication with a fitment aperture defined within the receiving vessel, the receiving fitment including a fitment housing having an actuator post configured to engage the sealing member of the dosing cap, and wherein the fitment housing includes a tubular sidewall having an open top edge, open bottom edge and an annular collar located on an external surface of the tubular sidewall an intermediate distance between the top end and bottom edge thereby dividing the fitment housing into an upper portion and a lower portion, wherein the receiving fitment is mounted within the fitment aperture and the annular collar engages the receiving vessel whereby the lower portion resides within the receiving vessel and the upper portion extends outwardly from the receiving vessel, the receiving fitment further including a locking nut having first threading configured to engage corresponding second threading defined on the lower portion of the tubular sidewall whereby the locking nut releasably secures the receiving housing to the receiving vessel;
    c) inverting the source container to charge the dosage region with the source material;
    d) mounting the source container onto the receiving fitment whereby the sealing member of the dosing cap is positioned to engage the actuator post on the receiving fitment; and
    e) applying an actuation force to the dosing cap thereby actuating the sealing member to bias the spring to the compressed condition to thereby dispense the measured dose from the source container into the receiving vessel.

2. The method of claim 1 further comprising:
    f) removing the actuation force from the dosing cap without reverting the source container; and
    g) applying a second actuation force to the dosing cap to thereby dispense a second measured dose into the receiving vessel.

3. A dosing cap for dispensing a measured dose from a source container to a receiving vessel, the dosing cap comprising:
- a) a housing including an inlet end having an inlet aperture configured to reside within a container opening formed on the source container and receive the measured dose from the source container, and an outlet end having an outlet orifice configured to couple with the receiving vessel, wherein the housing further defines a dosage region interposed between the inlet end and outlet end, the dosage region defining the measured dose, and wherein the housing further includes a weep hole located an intermediate distance between the inlet aperture and the outlet orifice, and wherein the sealing member further includes a third seal;
- b) a sealing member including a shaft slidingly received within the housing and extending from the inlet end to the outlet end of the housing, wherein the sealing member includes a first seal proximate the inlet end wherein the first seal is reciprocally coupled with and decoupled from the inlet aperture to selectively open or close the inlet aperture, and a second seal proximate the outlet end wherein the second seal is reciprocally coupled with and decoupled from the outlet orifice to selectively open or close the outlet orifice; and
- c) a spring to selectively bias the sealing member from a biased compressed condition to an unbiased resting condition wherein, when the spring is in the unbiased resting condition, the inlet aperture is open, the outlet orifice is closed and the dosage region is configured to be charged with the measured dose, and wherein, when the spring is biased to the compressed condition, the inlet aperture is closed and the outlet orifice is open whereby the measured dose is dispensed from the dosage region, wherein the third seal is a longitudinally spaced distance from the weep hole when the spring is in the unbiased resting condition and wherein the third seal overlaps and seals the weep hole when the spring is in the compressed condition.

4. A dosing apparatus configured to dispense a measured dose of a source material from a source container to a receiving vessel, the source container including a sidewall defining a cavity configured to hold the source material and wherein the sidewall further defines an opening to permit transfer of the source material therethrough, the apparatus comprising:
- a) a dosing cap configured to be mounted to the source container, the dosing cap comprising:
  - i) a housing including an inlet end having an inlet aperture configured to reside within the source container opening and receive the measured dose from the source container, and an outlet end having an outlet orifice configured to couple with the receiving vessel, wherein the housing further defines a dosage region interposed between the inlet end and outlet end, the dosage region defining the measured dose;
  - ii) a sealing member including a shaft slidingly received within the housing and extending from the inlet end to the outlet end of the housing, wherein the sealing member includes a first seal proximate the inlet end that is reciprocally coupled with and decoupled from the inlet aperture to selectively open or close the inlet aperture, and a second seal proximate the outlet end that is reciprocally coupled with and decoupled from the outlet orifice to selectively open or close the outlet orifice; and
  - iii) a spring to selectively bias the sealing member from a biased compressed condition to an unbiased resting condition wherein, when the spring is in the unbiased resting condition, the inlet aperture is open, the outlet orifice is closed and the dosage region is configured to be charged with the measured dose, and wherein, when the spring is biased to the compressed condition, the inlet aperture is closed and the outlet orifice is open whereby the measured dose is dispensed from the dosage region; and
- b) a receiving fitment configured to be mounted in communication with a fitment aperture defined within the receiving vessel, the receiving fitment including a fitment housing having an actuator post configured to engage the sealing member of the dosing cap to actuate the spring to the compressed condition upon application of an actuation force to the dosing cap whereby the measured dose is dispensed from the dosage region into the receiving vessel, and wherein the fitment housing includes a tubular sidewall having an open top edge, open bottom edge and an annular collar located on an external surface of the tubular sidewall an intermediate distance between the top end and bottom edge thereby dividing the fitment housing into an upper portion and a lower portion, wherein the receiving fitment is mounted within the fitment aperture and the annular collar engages the receiving vessel whereby the lower portion resides within the receiving vessel and the upper portion extends outwardly from the receiving vessel, the receiving fitment further including a locking nut having first threading configured to engage corresponding second threading defined on the lower portion of the tubular sidewall whereby the locking nut releasably secures the receiving housing to the receiving vessel.

5. The dosing apparatus of claim 4 wherein the opening is defined by a neck portion of the source container and wherein the dosing cap housing further includes an external annular ring configured to engage the neck portion whereby the inlet end resides within the cavity and the outlet end resides outside of the cavity.

6. The dosing apparatus of claim 5 wherein an external surface of the neck portion includes first threading and wherein the dosing apparatus further comprises:
- c) a retaining cap having a sidewall and top panel, wherein the top panel of the retaining cap includes a cap aperture proportioned to permit passage of the outlet end of the dosing cap therethrough while the external annular ring engages the top panel whereby at least a portion of the inlet end is received within the retaining cap sidewall, and wherein an internal surface of the retaining cap sidewall includes corresponding second threading configured to threadably engage with the first threading of the neck portion so as to releasably secure the dosing cap to the container.

7. The dosing apparatus of claim 4 wherein the receiving fitment further includes a gasket positioned between the locking nut and the receiving vessel.

8. The dosing apparatus of claim 4 wherein the receiving fitment further includes a fitment cap having cap threading configured to engage corresponding upper sidewall threading defined on the upper portion of the tubular sidewall whereby the fitment cap is releasably mounted onto the tubular sidewall.

9. The dosing apparatus of claim 8 wherein the fitment cap includes a pressure release valve in communication with fitment aperture whereby excess pressure within the receiving vessel is relieved by the pressure release valve.

10. The dosing apparatus of claim 4 wherein actuator post is coupled to an internal wall of the fitment housing proximate the tubular sidewall and offset from a central axis of the fitment housing.

11. The dosing apparatus of claim 10 wherein the fitment housing further includes an actuator sidewall proportioned to receive the outlet end of the dosing cap wherein the offset actuator post is positioned within the actuator sidewall to thereby engage the sealing member and actuate the spring.

12. A dosing system configured to dispense a measured dose of a source material, the dosing system comprising:
   a) a source container having a sidewall defining a cavity configured to hold the source material, wherein the sidewall further defines an opening to permit transfer of the source material therethrough;
   b) a dosing cap configured to be mounted to the source container, the dosing cap comprising:
      i) a housing including an inlet end having an inlet aperture configured to reside within the source container opening and receive the measured dose from the source container, and an outlet end having an outlet orifice configured to couple with the receiving vessel, wherein the housing further defines a dosage region interposed between the inlet end and outlet end, the dosage region defining the measured dose;
      ii) a sealing member including a shaft slidingly received within the housing and extending from the inlet end to the outlet end of the housing, wherein the sealing member includes a first seal proximate the inlet end that is reciprocally coupled with and decoupled from the inlet aperture to selectively open or close the inlet aperture, and a second seal proximate the outlet end that is reciprocally coupled with and decoupled from the outlet orifice to selectively open or close the outlet orifice; and
      iii) a spring to selectively bias the sealing member from a biased compressed condition to an unbiased resting condition wherein, when the spring is in the unbiased resting condition, the inlet aperture is open, the outlet orifice is closed and the dosage region is configured to be charged with the measured dose, and wherein, when the spring is biased to the compressed condition, the inlet aperture is closed and the outlet orifice is open whereby the measured dose is dispensed from the dosage region;
   c) a receiving vessel having a receiving fitment configured to be mounted in communication with a fitment aperture defined within the receiving vessel, the receiving fitment including a fitment housing having an actuator post configured to engage the sealing member of the dosing cap to actuate the spring to the compressed condition upon application of an actuation force to the dosing cap whereby the measured dose is dispensed from the dosage region into the receiving vessel, wherein the receiving vessel further includes a discharge port a spaced distance from the fitment aperture, the discharge port configured to receive a fluid delivery mechanism whereby a fluid within the receiving vessel is discharged through the fluid delivery mechanism, and wherein the receiving fitment may be selectively removed from the receiving vessel without requiring removal of the fluid delivery mechanism whereby the receiving vessel may be filled with a recharge fluid through the fitment aperture.

* * * * *